(12) United States Patent
Sassi

(10) Patent No.: US 9,064,295 B2
(45) Date of Patent: Jun. 23, 2015

(54) ENHANCED VIDEO ENCODING USING DEPTH INFORMATION

(71) Applicant: Sony Mobile Communications AB, Lund (SE)

(72) Inventor: Jari Sassi, Lund (SE)

(73) Assignee: Sony Corporation, Tokyo (JP)

(*) Notice: Subject to any disclaimer, the term of this patent is extended or adjusted under 35 U.S.C. 154(b) by 28 days.

(21) Appl. No.: 13/758,023

(22) Filed: Feb. 4, 2013

(65) Prior Publication Data

US 2014/0219572 A1 Aug. 7, 2014

(51) Int. Cl.
| | |
|---|---|
| *G06T 9/00* | (2006.01) |
| *H04N 19/597* | (2014.01) |
| *H04N 19/115* | (2014.01) |
| *H04N 19/136* | (2014.01) |
| *H04N 19/17* | (2014.01) |
| *H04N 19/167* | (2014.01) |

(52) U.S. Cl.
CPC ............... *G06T 9/00* (2013.01); *H04N 19/597* (2014.11); *H04N 19/115* (2014.11); *H04N 19/136* (2014.11); *H04N 19/17* (2014.11); *H04N 19/167* (2014.11)

(58) Field of Classification Search
CPC ............... G06K 9/36; H04N 19/0009; H04N 19/00121; H04N 19/00248; H04N 19/00278; H04N 19/00775; H04N 13/0239; H04N 13/0296; H04N 5/247; H04N 13/025; H04N 19/115; H04N 19/136; H04N 19/167; H04N 19/597; H04N 19/17; G06T 9/00
USPC ......... 382/154, 166, 232, 248, 118, 165, 173; 396/325, 89, 33; 348/47, 46
See application file for complete search history.

(56) References Cited

U.S. PATENT DOCUMENTS

| | | | | |
|---|---|---|---|---|
| 6,801,642 | B2* | 10/2004 | Gorday et al. | 382/118 |
| 7,899,321 | B2* | 3/2011 | Cameron et al. | 396/325 |
| 8,090,251 | B2* | 1/2012 | Campbell et al. | 396/89 |
| 8,270,752 | B2* | 9/2012 | Yea et al. | 382/260 |
| 8,615,140 | B2* | 12/2013 | Tin | 382/248 |
| 2003/0058939 | A1* | 3/2003 | Lee et al. | 375/240.08 |
| 2008/0309777 | A1* | 12/2008 | Aoyama | 348/222.1 |
| 2010/0239180 | A1* | 9/2010 | Yea et al. | 382/261 |
| 2011/0122224 | A1 | 5/2011 | Lou | |

(Continued)

FOREIGN PATENT DOCUMENTS

| | | |
|---|---|---|
| DE | 3608489 A1 | 9/1987 |
| EP | 0741496 A2 | 11/1996 |
| WO | 2009146407 A1 | 12/2009 |

OTHER PUBLICATIONS

European Patent Office; Extended European Search Report; Mar. 3, 2014; issued in European Patent Application No. 14153420.6.

*Primary Examiner* — Mekonen Bekele
(74) *Attorney, Agent, or Firm* — James C. Edwards; Moore & Van Allen PLLC (57) ABSTRACT

The invention is directed to systems, methods and computer program products for enhancing video encoding using depth information. An exemplary method comprises: determining, using a computing device, depth information associated with a first object in an image; determining, based on the depth information, that the first object is an object in focus; determining, based on the object in focus, a more important segment of an image; determining a first bit rate for encoding the more important segment of the image; and encoding the more important segment using the first bit rate.

20 Claims, 8 Drawing Sheets

(56) References Cited

U.S. PATENT DOCUMENTS

| | | | |
|---|---|---|---|
| 2011/0182498 A1* | 7/2011 | Morifuji et al. | 382/154 |
| 2011/0317912 A1* | 12/2011 | Oh et al. | 382/166 |
| 2012/0007949 A1* | 1/2012 | Lee et al. | 348/43 |
| 2013/0011047 A1* | 1/2013 | Kwon | 382/154 |
| 2013/0163095 A1* | 6/2013 | Wu et al. | 359/698 |
| 2013/0176416 A1* | 7/2013 | Fukui | 348/81 |
| 2013/0272601 A1* | 10/2013 | Morifuji et al. | 382/154 |
| 2013/0301907 A1* | 11/2013 | Shim et al. | 382/154 |

\* cited by examiner

ENHANCED VIDEO ENCODING USING DEPTH INFORMATION

BACKGROUND

There is a need to produce high quality video with limited bit rates.

BRIEF SUMMARY

Embodiments of the invention are directed to systems, methods and computer program products for enhanced video encoding using depth information. An exemplary method comprises determining, using a computing device, depth information associated with a first object in an image; determining, based on the depth information, that the first object is an object in focus; determining, based on the object in focus, a more important segment of an image; determining a first bit rate for encoding the more important segment of the image; and encoding the more important segment using the first bit rate.

In some embodiments, the method further comprises determining depth information associated with a second object in the image; determining, based on the depth information associated with the second object in the image, that the second object is not an object in focus; and determining, based on the object not in focus, a less important segment of the image.

In some embodiments, the method further comprises determining a second bit rate for encoding the less important segment of the image; and encoding the less important segment using the second bit rate, wherein the second bit rate is less than the first bit rate.

In some embodiments, an available bit rate is based on the first bit rate and the second bit rate.

In some embodiments, a first distance between the first object and the computing device is less than a predetermined distance, and a second distance between the second object and the computing device is equal to or greater than the predetermined distance.

In some embodiments, the less important segment is not encoded.

In some embodiments, the less important segment comprises a background segment.

In some embodiments, the method further comprises replacing the less important segment with a customized image.

In some embodiments, the customized image comprises an advertisement.

In some embodiments, the computing device comprises an image-capturing device.

In some embodiments, the computing device comprises a mobile phone.

In some embodiments, the computing device comprises at least one of a time-of-flight image-capturing device or a stereoscopic image-capturing device.

In some embodiments, the image is associated with a video.

In some embodiments, the more important segment comprises a foreground segment.

In some embodiments, the depth information is determined either before or after the first bit rate is determined.

In some embodiments, the method further comprises generating a three-dimensional representation of the image.

In some embodiments, the method further comprises capturing the image.

In some embodiments, the method further comprises at least one of the depth information or the first bit rate is determined either before, during, or after capturing the image.

In some embodiments, an apparatus is provided for encoding an image. The apparatus comprises a memory; a processor; and a module stored in the memory, executable by the processor, and configured to: determine depth information associated with a first object in an image; determine, based on the depth information, that the first object is an object in focus; determine, based on the object in focus, a more important segment of an image; determine a first bit rate for encoding the more important segment of the image; and encode the more important segment using the first bit rate.

In some embodiments, a computer program product is provided for encoding an image. The computer program product comprises a non-transitory computer-readable medium comprising a set of codes for causing a computer to: determine depth information associated with a first object in an image; determine, based on the depth information, that the first object is an object in focus; determine, based on the object in focus, a more important segment of an image; determine a first bit rate for encoding the more important segment of the image; and encode the more important segment using the first bit rate.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for enhancing video encoding using depth information. As used herein, video refers to a sequence of still images representing a scene in motion. Video encoding refers at least one of capturing video, compressing and/or decompressing video, converting video from one format to another, or generally processing video. As used herein, encoding may be performed using at least one of a hardware computing device or system or a software program. In some embodiments, the image-capturing device that captures the video may also be used to perform video encoding. In other embodiments, the image-capturing device transmits the captured video to another computing device that performs video encoding.

Bit rate refers to the number of bits that are conveyed or processed per unit of time. As used herein, the bit rate refers to the number of available bits that are used per unit time to represent data (e.g., audio and/or video). The number of available bits to represent data is limited, and the present invention is directed to determining an optimal use of the available bits. Embodiments of the invention enable division of an image frame into multiple segments, wherein each segment is represented by a different number of bits or encoded with a different bit rate. As used herein, an image frame may either be a still image frame that is captured at an instant of time or series of contiguous or continuous image frames that capture an event over a short or long duration (e.g., video). As used herein, an "image frame" is equivalent to an image.

In some embodiments, an image-capturing device (e.g., a camera) comprises a computational image-capturing device. A computational image-capturing device may have one or more lenses (e.g., twenty lenses). As used herein, a computational image-capturing device refers to any device that enables determination of information (e.g., depth information) associated with an image-frame that is being captured. As used herein, a depth determination is a determination of the distance between the image-capturing device and one or more points (e.g., objects) that are visible in the image frame. An object refers to any living or non-living thing captured in the image frame. The computational image-capturing device enables determination of the depth information at least one of before, during, or after capturing of the image-frame. A computational image-capturing device may have multiple lenses (e.g., twenty lenses). In some embodiments, the object of focus and/or the focus distance or other focus settings may be determined after an image has captured. In other embodiments, the image-capturing device comprises a stereo image-capturing device or a time-of-flight image-capturing device. A time-of-flight image-capturing device is a device that measures, for each point in an image-frame, the time-of-flight of a light signal that travels between the image-capturing device and one or more objects in the image frame. Therefore, the time-of-flight image-capturing device determines the distance between the image-capturing device and one or more points in the image frame. A stereoscopic image-capturing device has more than one lens (e.g., two lenses) and more than one image sensor (e.g., two image sensors). Each image sensor is associated with a separate lens. Using multiple image sensor-lens pairs, a stereoscopic image-capturing device simulates human binocular vision and enables capture of three-dimensional images. Additionally, the stereoscopic camera determines the distance between the image-capturing device and one or more points in the image frame.

The present invention may be used to distinguish "more important" segments of an image frame from the "less important" segments of the image frame. The importance of a particular segment in an image frame may be determined by a user either prior to, during, or after capturing an image frame, or alternatively, the image-capturing device described herein may include computer readable code structured to execute a function, a process, a method, or any part thereof, of the image-capturing device to determine the importance of a particular segment in an image frame either with or without intervention by a user. Such computer readable code may be structured to execute such function, process, method, or any part thereof, of the image-capturing device based upon pre-determined parameters. After distinguishing the more important segments of the image frame from the less important segments, a higher number of bits (or a higher bit-rate) are used to represent or encode the more important segments of the image frame while a fewer number of bits (or a lower-bit rate) are used to represent or encode the less important segments of the image frame.

As an example, the present invention may be used to encode a video of a sporting event. The video of the sporting event comprises several image frames. Each image frame comprises a foreground segment and a background segment. Both the foreground segment and the background segment represent parts of an image frame. The background segment may include an image of the spectators or audience. The foreground segment includes an image of the sporting event (e.g., a judo match, a tennis match, a soccer match, or the like). The image-capturing device determines that the background segment is the "less important" segment as described herein. Additionally, the image-capturing device determines that the foreground event is the "more important" segment as described herein.

The image-capturing device distinguishes the foreground segment from the background segment based on depth information determined by the image-capturing device. The image-capturing device determines the distance between the image-capturing device and various points in a scene (e.g., a scene to be captured, a scene that is being captured, or a scene that has already been captured). For example, an image-capturing device is positioned at an edge of a soccer field and the image-capturing device is capturing video of a moment in the game where the ball and the players around the ball are situated at a distance of 25 meters from the image-capturing device. Additionally, the image-capturing device determines that the distance from the image-capturing device to the spectators in the background or advertisement hoardings in the background is greater than 50 meters. Therefore, the image-capturing device classifies the segment of the image frame that is at a distance less than 25 meters as the foreground segment. Additionally, the image-capturing device classifies the segment of the image frame that is at distance greater than 50 meters as the background segment. In some embodiments, the image-capturing device may segment the image into more than two segments, wherein each segment is associated with a different distance from the image-capturing device.

In some embodiments, the image-capturing device determines that the foreground segment is defined by points in the scene that are at a distance from the image-capturing device less than a predetermined distance, and that the background segment is defined by points in the scene that are at a distance from the image-capturing device greater than or equal to the predetermined distance. The predetermined distance may be determined by the image-capturing device or may be defined by a user of the image-capturing device. For example, if the image-capturing device is positioned at an edge of a soccer field, the image-capturing device may determine that the pre-determined distance is the length or breadth of the field. In some embodiments, the image-capturing device's definition of the foreground and background segments changes as the video is being captured. For example, the image-capturing device's definition of the foreground and background segments changes based on the position of the soccer ball in the field of play.

The image-capturing device performs several steps. For example, the image-capturing device determines a target bit rate for one or more parts of an image frame (e.g., a foreground segment, a background segment, etc.) associated with a video. The target bit rate is determined at least one of prior to, during, or after capturing the video. Additionally, the image-capturing uses depth information as described herein to distinguish the various segments in the video. The depth information associated with various objects in the image frame is determined at least one of prior to, during, or after capturing the video. The depth information may be determined either before or after determining the target bit rate. Subsequently, the image-capturing device encodes each segment with a bit rate associated with the segment. For example, a foreground segment is encoded with a higher bit rate while a background segment is encoded with a lower bit rate.

The invention described herein assigns higher bit rates for "more important" segments (e.g., foreground segments) of the video and lower bit rates for "less important" segments (e.g., background segments) of the video. Since a lower bit rate is used for the background segment, when a spectator waves a flag or moves rapidly, a lower bit rate is used to encode the spectator's movement, thereby producing a lower quality video of the spectator's movement. On the contrary, when a player on the field moves rapidly (or the soccer ball moves rapidly), the rapid movement of the player or the ball is encoded with a higher bit rate, thereby producing a higher quality video of the movement. In some embodiments, if the scene captured in the background segment is not required, no bits may be used to encode the background segment. Therefore, the background segment appears as a still image (or as a blank image) while the video of the event captured in the foreground segment continues to be encoded.

Additionally, since the image-capturing device separates an image frame into various segments, the image-capturing device or a separate computing device can be used to change the data associated with a segment. For example, a computing device that receives the video from the image-capturing device (along with additional information associated with the captured video including depth information) can insert advertisements or commercials into the background segment. The background segment as received from the image-capturing device may comprise video of the background event, a still image of the background event, or a blank image. Since the receiving computing device determines the data to be inserted into the background segment, different receiving computing devices can insert different data into the background segment (e.g., local advertisements associated with the area where the receiving computing device is located). As an additional example, if a balloon or a flying object is part of the background segment, an advertisement can be placed onto the flying object.

In some embodiments, the image-capturing device captures high-quality video (e.g., a video quality equal to or greater than a predetermined quality or sharpness level) for both the foreground and background segments. When the image-capturing device or another computing system associated with the image-capturing device streams the captured video to a recipient device, a user associated with the image-capturing device can determine whether the stream comprises only the foreground segment, only the background segment, or both the foreground and background segments.

In some embodiments, the image-capturing device identifies a plane (or any other fixed object) associated with a scene. The plane (or fixed object) may be encoded with a separate bit rate. For example, the plane may be a football field and the football field may be encoded (during the image capturing process) with a lower bit rate compared to the players playing on the football field. The plane may extend through the depth of the image. When the captured image (e.g., video) is being streamed to a recipient device, an advertisement may be projected onto the plane by the image-capturing device or a separate computing system associated with the image-capturing device. In still other embodiments, the recipient device may receive the streamed video and may separately receive information associated with an advertisement. Subsequently, the recipient device projects the advertisement onto the plane. The type of advertisement projected onto the plane may depend on the geographical (or network) location of the recipient device.

In some embodiments, the image-capturing device may be used to focus on a moving ball (e.g., a tennis ball) on a tennis court. Assume the image-capturing device is situated above a tennis court. The image-capturing device assigns a higher bit rate to the ball (e.g., the movement of the ball) compared to any other data points in the image frame. For example, a lower bit rate is used to capture the video of the tennis court in the background. The image-capturing device captures the video of the ball's movement along with depth information associated with each point during the ball's movement. Either the image-capturing device or a separate computing device can determine whether a ball landed on the line (e.g., a baseline or a sideline) or outside the line in order to resolve a disputed line call. This determination can be made based on the depth information associated with the ball's movement. The depth information can be used to determine the location where the ball touched the ground, and consequently can be used to determine whether the ball touched a line (e.g., a baseline or a sideline) of the court or did not touch a line of the court. Additionally or alternatively, this determination can be made based on replaying a video of the ball's movement. This captured video is of a high quality because a higher bit rate is used to encode the movement of the ball. Replaying the video helps referees to make an appropriate decision (e.g., whether the ball is 'in' or 'out').

In some embodiments where a soccer game is being captured, two or more image-capturing devices are positioned at the edges around the field. For example, if the field of play has a quadrilateral shape, a first image-capturing device is positioned on one edge of the field and a second image capturing-device is positioned on an opposite edge of the field. Both the first image-capturing device and the second image-capturing device focus on the movement of the players and the ball as opposed to the spectators. Therefore, each image-capturing device encodes the video of the players and the ball with a higher bit rate. Additionally, each image-capturing device captures, for each point in time during the captured video, depth information associated with the ball and/or the players in the field of play (e.g., the foreground event). Each image-capturing device transmits (e.g., in real-time) the captured video (along with the recorded depth information) to a separate computing device. The computing device receives the data from the multiple image-capturing devices and constructs (e.g., in real-time) three-dimensional video (or images) associated with the foreground event. The computing device can generate three-dimensional position (and angle) information associated with the ball and each player in the field of play. Additionally, the three-dimensional position (and angle) information can be used to generate high quality three-dimensional video of field movements (e.g., a slow-motion recreation) for replay purposes.

In some embodiments, the image-capturing device determines the foreground segment (or the "more important" segment) based on the focus settings and/or depth-of-field settings of the image-capturing device. For example, the image-capturing device (or based on user input) determines a focus distance to an object in an image frame. As used herein, a focus distance is the distance from the image-capturing device (e.g., a lens of the image-capturing device) to an object in a scene to be captured, where a user of the image-capturing device desires that the object in the scene have a higher degree of sharpness when compared to other objects in the scene. Therefore, when an image-capturing device captures the scene, a lens positioned in the image-capturing device may cause light to converge upon an image of the object in the captured image frame. When a lens associated with an image-capturing device focuses on an object at a distance, other objects at that distance may also have a similarly high degree of sharpness when captured by the image-capturing device. An object that is not at the same distance (either closer to or further away from the image-capturing device) as the object in focus does have the same degree of sharpness as the object that is in focus.

As used herein, a zone of acceptable sharpness is referred to as the depth-of-field. Increasing the depth-of-field increases the sharpness of an image because the zone of acceptable sharpness becomes bigger. This means objects that are positioned within a larger range of depths will have a higher degree of sharpness when captured by the image-capturing device. Conversely, decreasing the depth-of-field decreases the sharpness of an image. In some embodiments, an aperture size of the image-capturing device may be reduced in order to increase the depth-of-field, and conversely an aperture size of the image-capturing device may be increased in order to reduce the depth-of-field. Therefore, the image-capturing device determines the foreground segment based on the focus distance and the depth-of-field setting as described herein.

As described herein, in some embodiments, the depth-of-field refers to the distance to the object. In some embodiments, the resolution of the depth-of-field is the number of bits used for the depth-of-field. A "step" may be determined by the image-capturing device in order to measure the depth-of-field. For example, when the distance to the object is 5 meters, a single step could be 10 centimeters, and when the distance to object is 50 meters, a single step could be 300 centimeters.

The image-capturing device determines that objects located within the depth-of-field zone comprise the foreground segment (e.g., the "more important" segment), and determines that objects located beyond the depth-of-field zone comprise the background segment (e.g., the "less important" segment). Additionally, in some embodiments, the image-capturing device may determine that objects closer to the image-capturing device than the depth-of-field zone also comprise a "less important" segment and consequently video of those objects is encoded with a lower bit rate. Therefore, in some embodiments, the "more important" segment comprises a zone (e.g., the depth-of-field zone) situated between 5 and 10 meters from the image-capturing device, and the "less important" segments comprise a zone that is situated less than 5 meters from the image-capturing device and a zone that is situated greater than 10 meters from the image-capturing device. The definitions of these zones may change as the video is being captured by the image-capturing device. For example, when the image-capturing device is following or focusing on a moving soccer ball on the field of play, the depth-of-field zone is a zone around the ball (e.g., a circular zone around the ball with a two meter radius from the ball). Therefore, the depth-of-field zone changes as the ball moves around the field of play.

As used herein, an image-capturing device may refer to any device that captures still images or video. Additionally or alternatively, an image-capturing device may refer to a computing device that is in communication with the image-capturing device. The invention is not limited to any particular types of image-capturing devices. Examples of image-capturing devices include mobile computing devices (e.g., mobile phones), image capturing devices (e.g., cameras), gaming devices, laptop computers, smart screens, tablet computers or tablets, desktop computers, e-readers, scanners, portable media players, televisions, or other portable or non-portable computing or non-computing devices.

Figure 1:
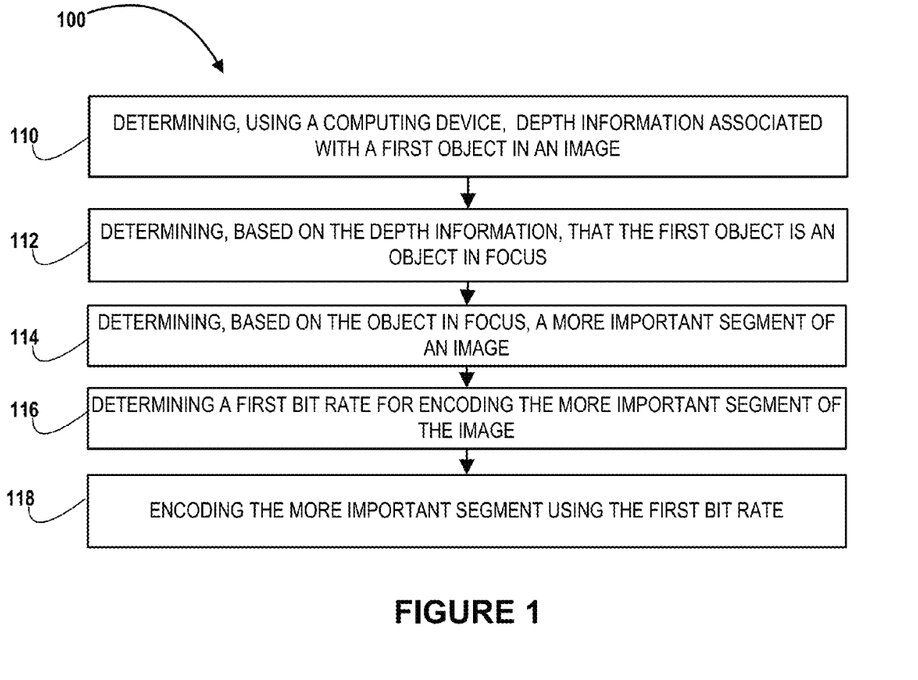
FIG. 1 is an exemplary process flow for enhanced video encoding using depth information, in accordance with embodiments of the present invention.

Referring now to FIG. 1, FIG. 1 presents a process flow 100 for performing enhanced video encoding using depth information. The various process blocks presented in FIG. 1 may be executed in an order that is different from that presented in FIG. 1. At block 110, the process flow comprises determining, using a computing device, depth information associated with a first object in an image. At block 112, the process flow comprises determining, based on the depth information, that the first object is an object in focus. At block 114, the process flow comprises determining, based on the object in focus, a more important segment of an image. At block 116, the process flow comprises determining a first bit rate for encoding the more important segment of the image. At block 118, the process flow comprises encoding the more important segment using the first bit rate.

Figure 2:
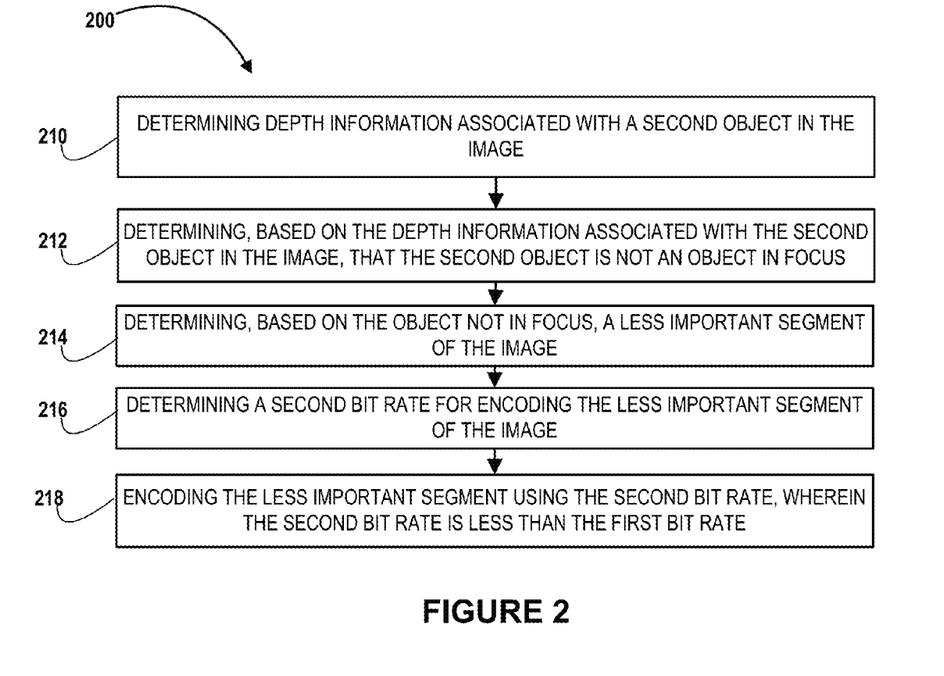
FIG. 2 is another exemplary process flow for enhanced video encoding using depth information, in accordance with embodiments of the present invention.

Referring now to FIG. 2, FIG. 2 presents another process flow 200 for performing enhanced video encoding using depth information. The various process blocks presented in FIG. 2 may be executed in an order that is different from that presented in FIG. 2. At block 210, the process flow comprises determining depth information associated with a second object in the image. At block 212, the process flow comprises determining, based on the depth information associated with the second object in the image, that the second object is not an object in focus. At block 214, the process flow comprises determining, based on the object not in focus, a less important segment of the image. At block 216, the process flow comprises determining a second bit rate for encoding the less important segment of the image. At block 218, the process flow comprises encoding the less important segment using the second bit rate, wherein the second bit rate is less than the first bit rate.

Figure 3:
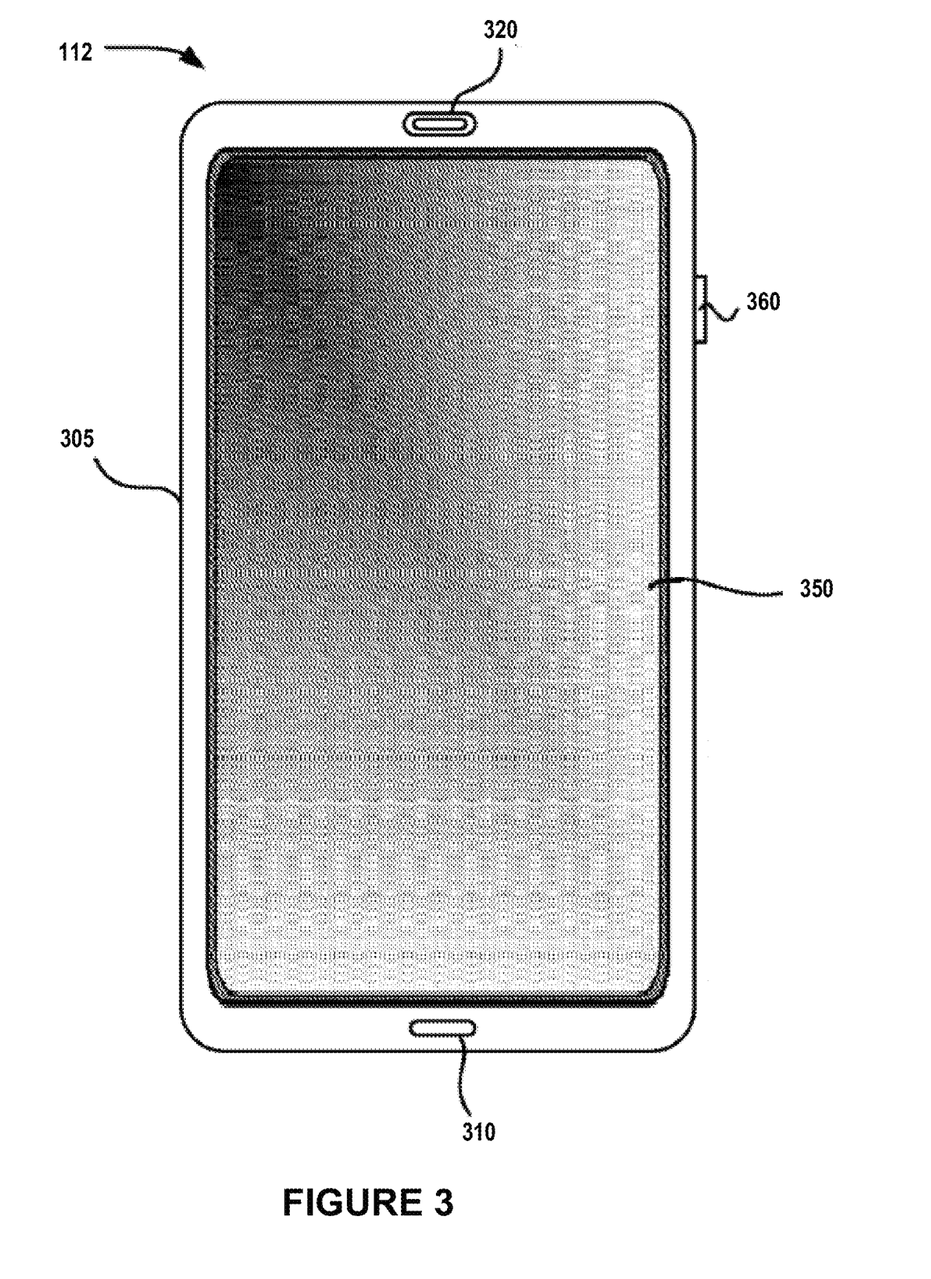
FIG. 3 is an exemplary image-capturing device, in accordance with embodiments of the present invention.

Referring now to FIG. 3, FIG. 3 is a diagram illustrating a front view of external components of an exemplary image-capturing device. As illustrated in FIG. 3, image-capturing device 112 may include a housing 305, a microphone 310, a speaker 320, a display 350, and a camera button 360.

Housing 305 may include a structure configured to contain or at least partially contain components of image-capturing device 112. For example, housing 305 may be formed from plastic, metal or other natural or synthetic materials or combination(s) of materials and may be configured to support microphone 310, speaker 320, display 350, and camera button 360.

Microphone 310 may include any component capable of transducing air pressure waves to a corresponding electrical signal. For example, a user may speak into microphone 310 during a telephone call. Speaker 320 may include any component capable of transducing an electrical signal to a corresponding sound wave. For example, a user may listen to music through speaker 320.

The display 350 may function as a touchpad or touchscreen. Touchpad may include any component capable of providing input to device 112. Touchpad may include a standard telephone keypad or a QWERTY keypad. Touchpad may also include one or more special purpose keys. A user may utilize touchpad for entering information, such as text or a phone number, or activating a special function, such as placing a telephone call, playing various media, setting various camera features (e.g., focus, zoom, etc.) or accessing an application.

Display 350 may include any component capable of providing visual information. For example, in one implementation, display 350 may be a liquid crystal display (LCD). In another implementation, display 350 may be any one of other display technologies, such as a plasma display panel (PDP), a field emission display (FED), a thin film transistor (TFT) display, etc. Display 350 may be utilized to display, for example, text, image, and/or video information. Display 350 may also operate as a view finder, as will be described later. Camera button 360 may be a pushbutton that enables a user to take an image.

Since image-capturing device 112 illustrated in FIG. 3 is exemplary in nature, image-capturing device 112 is intended to be broadly interpreted to include any type of electronic device that includes an image-capturing component. For example, image-capturing device 112 may include a mobile phone, a personal digital assistant (PDA), a portable computer, a camera, or a watch. In other instances, image-capturing device 112 may include, for example, security devices or military devices. Accordingly, although FIG. 3 illustrates exemplary external components of image-capturing device 112, in other implementations, image-capturing device 112 may contain fewer, different, or additional external components than the external components depicted in FIG. 3. Additionally, or alternatively, one or more external components of image-capturing device 112 may include the capabilities of one or more other external components of image-capturing device 112. For example, display 350 may be an input component (e.g., a touch screen). The touch screen may function as a keypad or a touchpad. Additionally, or alternatively, the external components may be arranged differently than the external components depicted in FIG. 3.

Figure 4:
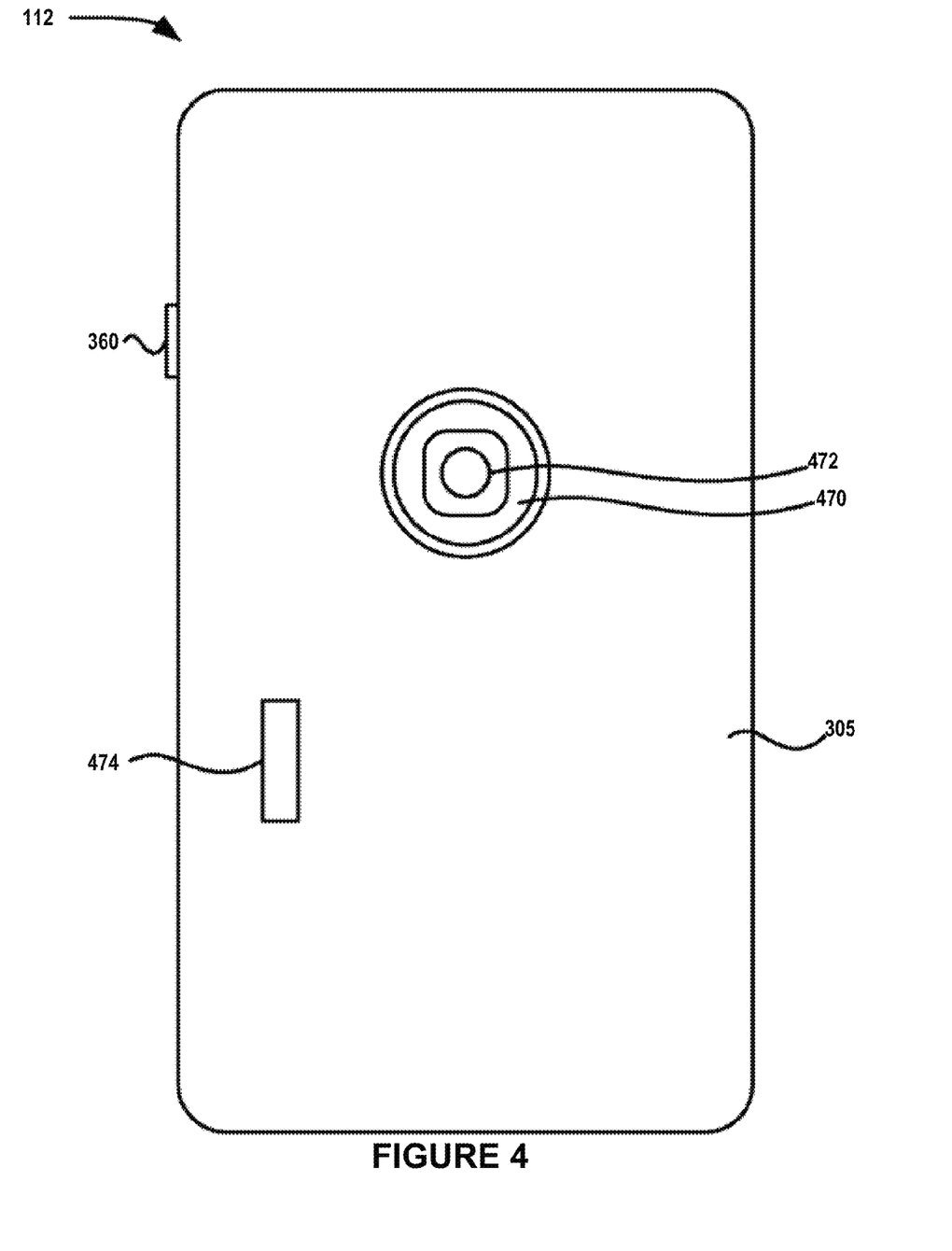
FIG. 4 is a diagram illustrating a rear view of exemplary external components of the image-capturing device depicted in FIG. 3, in accordance with embodiments of the present invention.

Referring now to FIG. 4, FIG. 4 is a diagram illustrating a rear view of external components of the exemplary image-capturing device. As illustrated, in addition to the components previously described, image-capturing device 112 may include a camera 470, a lens assembly 472, a proximity sensor 476, and a flash 474.

Camera 470 may include any component capable of capturing an image. Camera 470 may be a digital camera. Display 350 may operate as a view finder when a user of image-capturing device 112 operates camera 470. Camera 470 may provide for adjustment of a camera setting. In one implementation, image-capturing device 112 may include camera software that is displayable on display 350 to allow a user to adjust a camera setting.

Lens assembly 472 may include any component capable of manipulating light so that an image may be captured. Lens assembly 472 may include a number of optical lens elements. The optical lens elements may be of different shapes (e.g., convex, biconvex, plano-convex, concave, etc.) and different distances of separation. An optical lens element may be made from glass, plastic (e.g., acrylic), or plexiglass. The optical lens may be multicoated (e.g., an antireflection coating or an ultraviolet (UV) coating) to minimize unwanted effects, such as lens flare and inaccurate color. In one implementation, lens assembly 472 may be permanently fixed to camera 470. In other implementations, lens assembly 472 may be interchangeable with other lenses having different optical characteristics. Lens assembly 472 may provide for a variable aperture size (e.g., adjustable f-number).

Proximity sensor 476 (not shown in FIG. 4) may include any component capable of collecting and providing distance information that may be used to enable camera 470 to capture an image properly. For example, proximity sensor 476 may include a proximity sensor that allows camera 470 to compute the distance to an object. In another implementation, proximity sensor 476 may include an acoustic proximity sensor. The acoustic proximity sensor may include a timing circuit to measure echo return of ultrasonic soundwaves. In embodiments that include a proximity sensor 476, the proximity sensor may be used to determine a distance to one or more moving objects, which may or may not be in focus, either prior to, during, or after capturing of an image frame of a scene. In some embodiments, proximity of an object to the image-capturing device may be calculated during a post-processing step (e.g., after capturing the image).

Flash 474 may include any type of light-emitting component to provide illumination when camera 470 captures an image. For example, flash 474 may be a light-emitting diode (LED) flash (e.g., white LED) or a xenon flash. In another implementation, flash 474 may include a flash module.

Although FIG. 4 illustrates exemplary external components, in other implementations, image-capturing device 112 may include fewer, additional, and/or different components than the exemplary external components depicted in FIG. 4. For example, in other implementations, camera 470 may be a film camera. Additionally, or alternatively, depending on image-capturing device 112, flash 474 may be a portable flashgun. Additionally, or alternatively, image-capturing device 112 may be a single-lens reflex camera. In still other implementations, one or more external components of image-capturing device 112 may be arranged differently.

Figure 5:
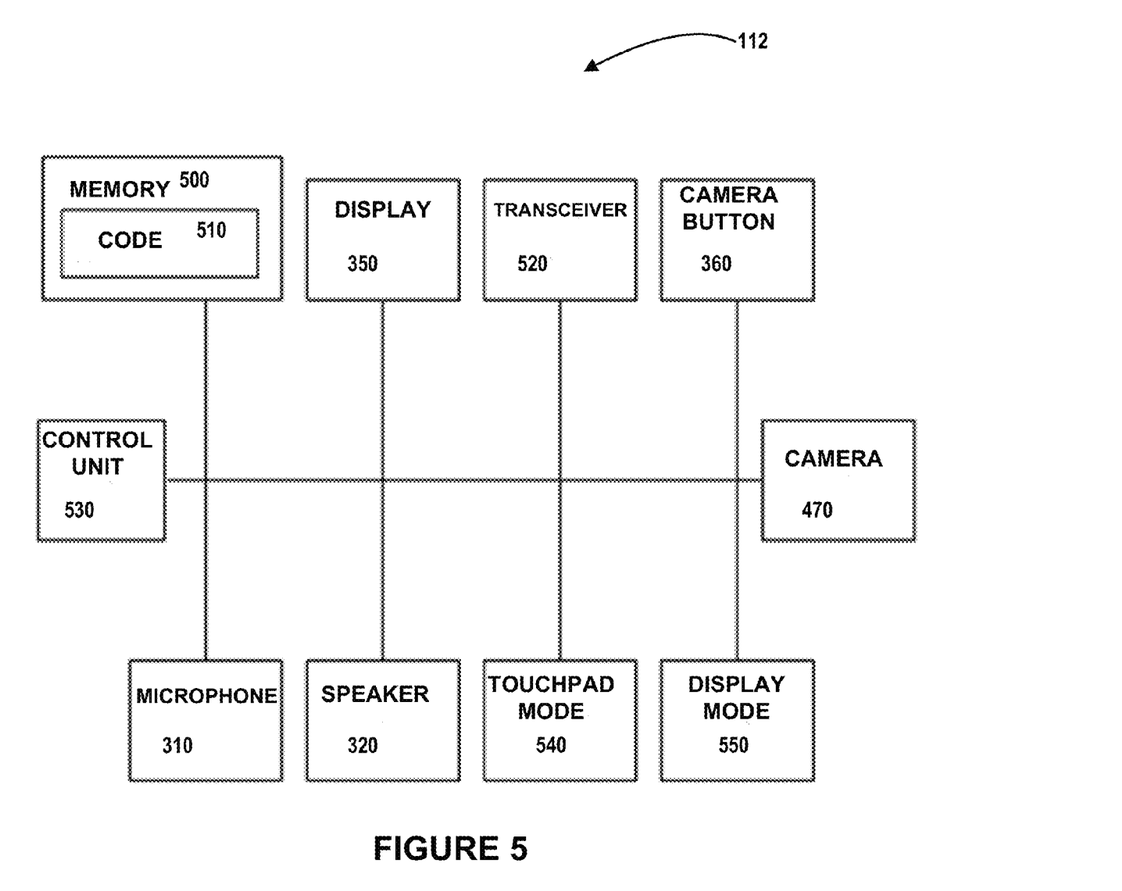
FIG. 5 is a diagram illustrating exemplary internal components of the image-capturing device depicted in FIG. 3, in accordance with embodiments of the present invention.

Referring now to FIG. 5, FIG. 5 is a diagram illustrating internal components of the exemplary image-capturing device. As illustrated, image-capturing device 112 may include microphone 310, speaker 320, display 350, camera button 360, camera 470, a memory 500, a transceiver 520, and a control unit 530. Additionally, the control unit 530 may enable a user to switch between touchpad mode 540 and display mode 550. In touchpad mode 540, the display 350 functions as at least one of an input device (e.g., a numeric keypad or a QWERTY touchpad) or an output device. In display mode 550, the display 350 functions as an output device.

Memory 500 may include any type of storing component to store data and instructions related to the operation and use of image-capturing device 112. For example, memory 500 may include a memory component, such as a random access memory (RAM), a read only memory (ROM), and/or a programmable read only memory (PROM). Additionally, memory 500 may include a storage component, such as a magnetic storage component (e.g., a hard drive) or other type of computer-readable or computer-executable medium. Memory 500 may also include an external storing component, such as a Universal Serial Bus (USB) memory stick, a digital camera memory card, and/or a Subscriber Identity Module (SIM) card.

Memory 500 may include a code component 510 that includes computer-readable or computer-executable instructions to perform one or more functions. These functions include initiating and/or executing the processes described herein. The code component 510 may work in conjunction with one or more other hardware or software components associated with the image-capturing device 112 to initiate and/or execute the processes described herein. Additionally, code component 510 may include computer-readable or computer-executable instructions to provide other functionality other than as described herein.

Transceiver 520 may include any component capable of transmitting and receiving information wirelessly or via a wired connection. For example, transceiver 520 may include a radio circuit that provides wireless communication with a network or another device.

Control unit 530 may include any logic that may interpret and execute instructions, and may control the overall operation of image-capturing device 112. Logic, as used herein, may include hardware, software, and/or a combination of hardware and software. Control unit 530 may include, for example, a general-purpose processor, a microprocessor, a data processor, a co-processor, and/or a network processor. Control unit 530 may access instructions from memory 500, from other components of image-capturing device 112, and/or from a source external to image-capturing device 112 (e.g., a network or another device).

Control unit 530 may provide for different operational modes associated with image-capturing device 112. Additionally, control unit 530 may operate in multiple modes simultaneously. For example, control unit 530 may operate in a camera mode, a music player mode, and/or a telephone mode. For example, when in camera mode, face-detection and tracking logic may enable image-capturing device 112 to detect and track multiple objects (e.g., the presence and position of each object's face) within an image to be captured. The face-detection and tracking capability of image-capturing device 112 will be described in greater detail below.

Although FIG. 5 illustrates exemplary internal components, in other implementations, image-capturing device 112 may include fewer, additional, and/or different components than the exemplary internal components depicted in FIG. 5. For example, in one implementation, image-capturing device 112 may not include transceiver 520. In still other implementations, one or more internal components of image-capturing device 112 may include the capabilities of one or more other components of image-capturing device 112. For example, transceiver 520 and/or control unit 530 may include their own on-board memory.

Figure 6:
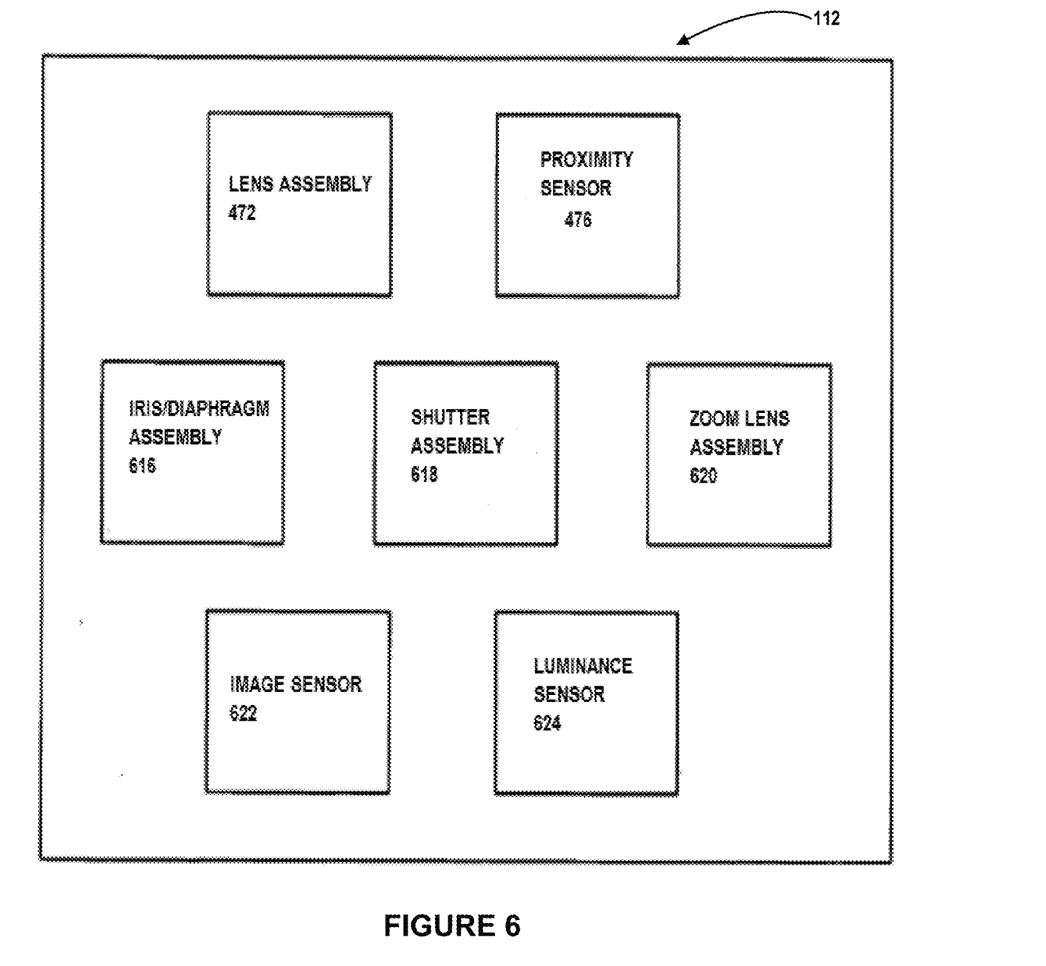
FIG. 6 is a diagram illustrating components of an exemplary camera depicted in FIG. 5, in accordance with embodiments of the present invention.

Referring now to FIG. 6, FIG. 6 is a diagram illustrating components of the exemplary camera depicted in FIG. 5. FIG. 6 illustrates lens assembly 472, proximity sensor 476, an iris/diaphragm assembly 616, a shutter assembly 618, a zoom lens assembly 620, an image sensor 622, and a luminance sensor 624.

Iris/diaphragm assembly 616 may include any component providing an aperture. Iris/diaphragm assembly 616 may be a thin, opaque, plastic structure with one or more apertures. This iris/diaphragm assembly 616 may reside in a light path of lens assembly 472. Iris/diaphragm assembly 616 may include different size apertures. In such instances, iris/diaphragm assembly 616 may be adjusted to provide a different size aperture. In other implementations, iris/diaphragm assembly 616 may provide only a single size aperture.

Shutter assembly 618 may include any component for regulating a period of time for light to pass through iris/diaphragm assembly 616. Shutter assembly 618 may include one or more shutters (e.g., a leaf or a blade). The leaf or blade may be made of, for example, a metal or a plastic. In one implementation, multiple leaves or blades may rotate about pins so as to overlap and form a circular pattern. In one implementation, shutter assembly 618 may reside within lens assembly 472 (e.g., a central shutter). In other implementations, shutter assembly 618 may reside in close proximity to image sensor 622 (e.g., a focal plane shutter). Shutter assembly 618 may include a timing mechanism to control a shutter speed. The shutter speed may be adjusted.

Zoom lens assembly 620 may include lens elements to provide magnification and focus of an image based on the relative position of the lens elements. Zoom lens assembly 620 may include fixed and/or movable lens elements. In one implementation, a movement of lens elements of zoom lens assembly 620 may be controlled by a servo mechanism that operates in cooperation with control unit 530.

Image sensor 622 may include any component to capture light. For example, image sensor 622 may be a charge-coupled device (CCD) sensor (e.g., a linear CCD image sensor, an interline CCD image sensor, a full-frame CCD image sensor, or a frame transfer CCD image sensor) or a Complementary Metal Oxide Semiconductor (CMOS) sensor. Image sensor 622 may include a grid of photo-sites corresponding to pixels to record light. A color filter array (CFA) (e.g., a Bayer color filter array) may be on image sensor 622. In other implementations, image sensor 622 may not include a color filter array. The size of image sensor 622 and the number and size of each pixel may vary depending on image-capturing device 112. Image sensor 622 and/or control unit 530 may perform various image processing, such as color aliasing and filtering, edge detection, noise reduction, analog to digital conversion, interpolation, compression, white point correction, etc.

Luminance sensor 624 may include any component to sense the intensity of light (i.e., luminance). Luminance sensor 624 may provide luminance information to control unit 530 so as to determine whether to activate flash 474. For example, luminance sensor 624 may include an optical sensor integrated circuit (IC).

Although FIG. 6 illustrates exemplary components, in other implementations, image-capturing device 112 may include fewer, additional, and/or different components than the exemplary components depicted in FIG. 6. For example, when image-capturing device 112 is a film camera, image sensor 622 may be film. Additionally, it is to be understood that variations may exist among different devices as to the arrangement, placement, number, adjustability, shape, material, etc., relating to the exemplary components described above. In still other implementations, one or more exemplary components of image-capturing device 112 may include the capabilities of one or more other components of image-capturing device 112. For example, lens assembly 472 may include zoom lens assembly 620.

Figure 7:
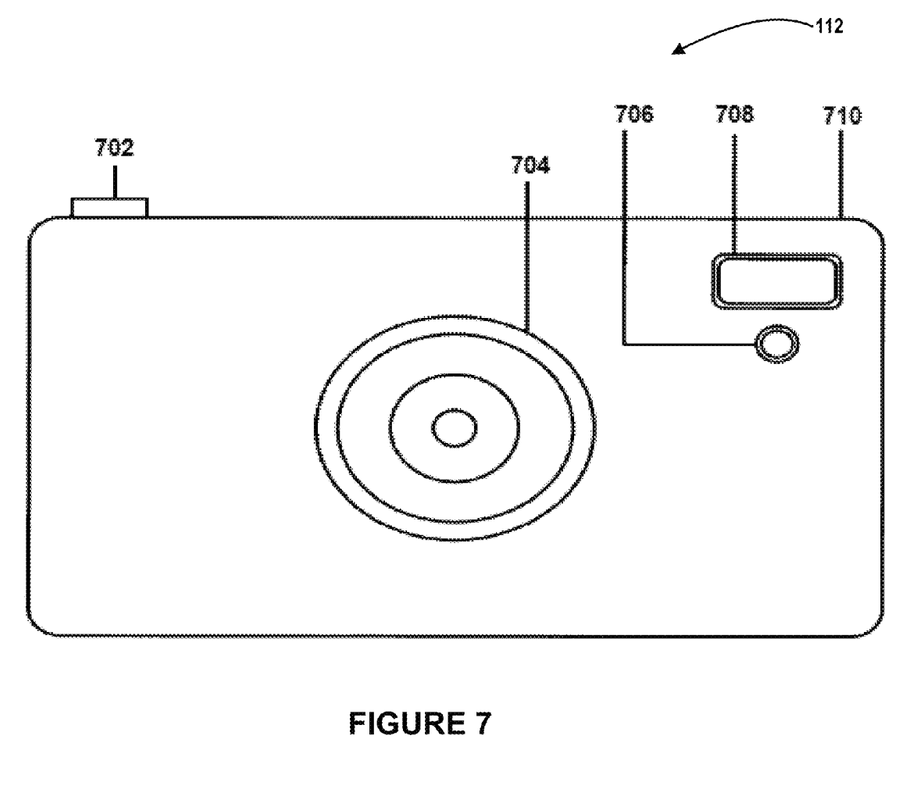
FIG. 7 is another exemplary image-capturing device, in accordance with embodiments of the present invention.
Figure 8:
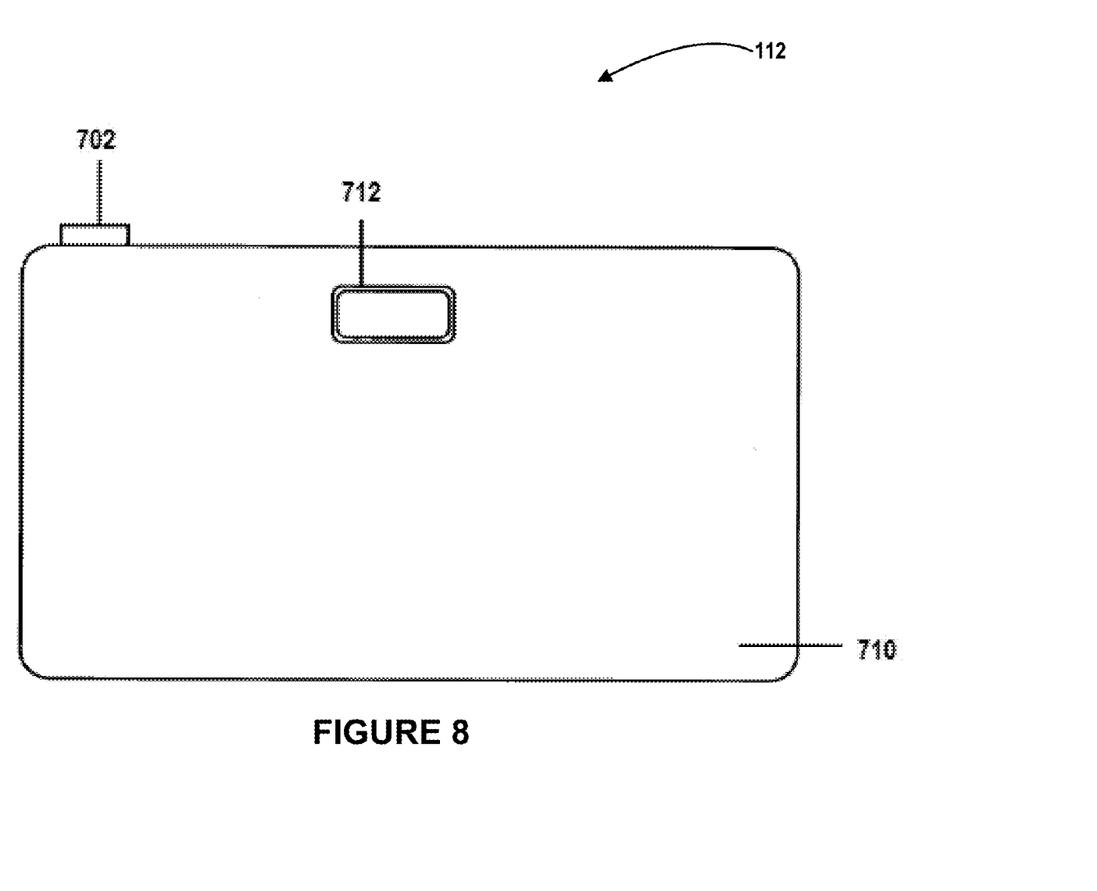
FIG. 8 is a diagram illustrating a rear view of exemplary external components of the image-capturing device depicted in FIG. 7, in accordance with embodiments of the present invention.

Referring now to FIGS. 7 and 8, FIGS. 7 and 8 are diagrams illustrating a front and rear view of external components of another exemplary image-capturing device. In this implementation, image-capturing device 112 may take the form of a camera, with or without additional communication functionality, such as the ability to make or receive telephone calls or connect to a data network. As illustrated, image-capturing device 112 may include a camera button 702, a lens assembly 704, a proximity sensor 706, a flash 708, a housing 710, and a viewfinder 712. Camera button 702, lens assembly 704, proximity sensor 706, flash 708, housing 710 and viewfinder 712 may include components that are similar to camera button 360, lens assembly 472, proximity sensor 476, flash 474, housing 305 and display 350 of image-capturing device 112, and may operate similarly. Although not illustrated, image-capturing device 112 may also include components that have been described with reference to FIGS. 5 and 6.

In accordance with embodiments of the invention, the term "module" with respect to a system (or a device) may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for encoding an image, the method comprising:
   determining, using a computing device, depth information associated with a first object in an image;
   determining, based on the depth information, that the first object is an object in focus;
   determining, based on the object in focus, a more important segment of an image,
   segmenting the image such that the more important segment comprises a segment in which objects are situated at a distance less than a first threshold distance from the computing device, and a less important segment comprises a segment in which objects are situated at a distance greater than a second threshold distance from the computing device, the second threshold distance being greater than the first threshold distance;
   determining a first bit rate for encoding the more important segment of the image; and
   encoding the more important segment using the first bit rate.

2. The method of claim 1, further comprising:
   determining depth information associated with a second object in the image;
   determining, based on the depth information associated with the second object in the image, that the second object is not an object in focus; and
   determining, based on the object not in focus, the less important segment of the image.

3. The method of claim 2, further comprising:
   determining a second bit rate for encoding the less important segment of the image; and
   encoding the less important segment using the second bit rate, wherein the second bit rate is less than the first bit rate.

4. The method of claim 3, wherein an available bit rate is based on the first bit rate and the second bit rate.

5. The method of claim 2, wherein a first distance between the first object and the computing device is less than a predetermined distance, and wherein a second distance between the second object and the computing device is equal to or greater than the predetermined distance.

6. The method of claim 2, wherein the less important segment is not encoded.

7. The method of claim 2, wherein the less important segment comprises a background segment.

8. The method of claim 2, further comprising replacing the less important segment with a customized image.

9. The method of claim 8, wherein the customized image comprises an advertisement.

10. The method of claim 1, wherein the computing device comprises an image-capturing device.

11. The method of claim 1, wherein the computing device comprises a mobile phone.

12. The method of claim 1, wherein the computing device comprises at least one of a time-of-flight image-capturing device or a stereoscopic image-capturing device.

13. The method of claim 1, wherein the image is associated with a video.

14. The method of claim 1, wherein the more important segment comprises a foreground segment.

15. The method of claim 1, wherein the depth information is determined after the first bit rate is determined.

16. The method of claim 1, further comprising generating a three-dimensional representation of the image.

17. The method of claim 1, further comprising capturing the image.

18. The method of claim 17, wherein at least one of the depth information or the first bit rate is determined either before, during, or after capturing the image.

19. An apparatus for encoding an image, the apparatus comprising:
   a memory;
   a processor; and
   a module stored in the memory, executable by the processor, and configured to:
   determine depth information associated with a first object in an image;
   determine, based on the depth information, that the first object is an object in focus;
   determine, based on the object in focus, a more important segment of an image;
   segment the image such that the more important segment comprises a segment in which objects are situated at a distance less than a first threshold distance from the apparatus, and a less important segment comprises a segment in which objects are situated at a distance greater than a second threshold distance from the apparatus, the second threshold distance being greater than the first threshold distance;
   determine a first bit rate for encoding the more important segment of the image; and
   encode the more important segment using the first bit rate.

20. A computer program product for encoding an image, the computer program product comprising:
   a non-transitory computer-readable medium comprising a set of codes for causing a computer to:
   determine depth information associated with a first object in an image;
   determine, based on the depth information, that the first object is an object in focus;
   determine, based on the object in focus, a more important segment of an image;
   segment the image such that the more important segment comprises a segment in which objects are situated at a distance less than a first threshold distance from the computer, and a less important segment comprises a segment in which objects are situated at a distance greater than a second threshold distance from the computer, the second threshold distance being greater than the first threshold distance;
   determine a first bit rate for encoding the more important segment of the image; and
   encode the more important segment using the first bit rate.

* * * * *